United States Patent
Xing (10) Patent No.: US 12,204,592 B2
(45) Date of Patent: Jan. 21, 2025

(54) SUPPORT FOR I/O WITH SIGNATURE FROM INITIATOR

(71) Applicant: Dell Products L.P., Round Rock, TX (US)

(72) Inventor: Jinxian Xing, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/328,237

(22) Filed: Jun. 2, 2023

(65) Prior Publication Data

US 2024/0403370 A1 Dec. 5, 2024

(51) Int. Cl.
G06F 17/00 (2019.01)
G06F 16/907 (2019.01)

(52) U.S. Cl.
CPC .................. G06F 16/907 (2019.01)

(58) Field of Classification Search
CPC .................................... G06F 16/907
See application file for complete search history.

(56) References Cited

U.S. PATENT DOCUMENTS

| | | | | |
|---|---|---|---|---|
| 7,127,465 B2 * | 10/2006 | Rao | ..................... | G06F 16/9027 |
| 8,635,383 B2 * | 1/2014 | Singh | ..................... | G06F 16/21 |
| | | | | 710/22 |
| 9,384,086 B1 * | 7/2016 | Craddock | ............... | G06F 13/00 |
| 2006/0242532 A1 * | 10/2006 | Joglekar | ............... | H04L 69/321 |
| | | | | 714/758 |
| 2011/0099461 A1 * | 4/2011 | Rajpal | ................. | G06F 11/1004 |
| | | | | 714/E11.032 |
| 2016/0255150 A1 * | 9/2016 | Dhuse | ..................... | G06F 3/067 |
| | | | | 709/213 |
| 2019/0042796 A1 * | 2/2019 | Von Bokern | ........ | G06F 9/45558 |

* cited by examiner

*Primary Examiner* — Greta L Robinson
(74) *Attorney, Agent, or Firm* — Daly, Crowley, Mofford & Durkee, LLP (57) ABSTRACT

A method for use in a computing device, the method comprising: detecting a first command to copy data to a remote system, the first command including a scatter-gather list (SGL) that identifies the data that is desired to be copied, the SGL including a plurality of entries that identify a plurality of memory regions, each of the plurality of entries identifying a different one of the plurality of memory regions; generating metadata for the SGL, for each of the data blocks in the plurality of memory regions, wherein the metadata identifies at least one of: (i) a location where a respective integrity field for the data block is stored, and (ii) a respective integrity operation that is required to be performed on the data block; registering the plurality of entries and the metadata under a key; generating a command capsule that includes the key; and transmitting the command capsule.

18 Claims, 5 Drawing Sheets

SUPPORT FOR I/O WITH SIGNATURE FROM INITIATOR

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a computing device, the method comprising: detecting, by the computing device, a first command to copy data to a remote system, the first command including a scatter-gather list (SGL) that identifies the data that is desired to be copied, the SGL including a plurality of entries that identify a plurality of memory regions, each of the plurality of entries identifying a different one of the plurality of memory regions, each of the plurality of memory regions including one or more data blocks; generating, by the computing device, metadata for the SGL, for each of the data blocks in the plurality of memory regions, wherein the metadata identifies at least one of: (i) a location where a respective integrity field for the data block is stored, and (ii) a respective integrity operation that is required to be performed on the data block; registering, by the computing device, the plurality of entries and the metadata under a key; generating, by the computing device, a command capsule that includes the key under which the plurality of entries and the metadata are registered; and transmitting, by the computing device, the command capsule to the remote system.

According to aspects of the disclosure, a system is provided, comprising: a memory; and a processing circuitry configured to perform the operations of: detecting a first command to copy data to a remote system, the first command including a scatter-gather list (SGL) that identifies the data that is desired to be copied, the SGL including a plurality of entries that identify a plurality of memory regions, each of the plurality of entries identifying a different one of the plurality of memory regions, each of the plurality of memory regions including one or more data blocks; generating metadata for the SGL, for each of the data blocks in the plurality of memory regions, wherein the metadata identifies at least one of: (i) a location where a respective integrity field for the data block is stored, and (ii) a respective integrity operation that is required to be performed on the data block; registering the plurality of entries and the metadata under a key; generating a command capsule that includes the key under which the plurality of entries and the metadata are registered; and transmitting the command capsule to the remote system.

According to aspects of the disclosure, a non-transitory computer-readable medium storing one or more processor-executable instructions, which when executed by a processing circuitry, further cause the processing circuitry to perform the operations of: detecting a first command to copy data to a remote system, the first command including a scatter-gather list (SGL) that identifies the data that is desired to be copied, the SGL including a plurality of entries that identify a plurality of memory regions, each of the plurality of entries identifying a different one of the plurality of memory regions, each of the plurality of memory regions including one or more data blocks; generating metadata for the SGL, for each of the data blocks in the plurality of memory regions, wherein the metadata identifies at least one of: (i) a location where a respective integrity field for the data block is stored, and (ii) a respective integrity operation that is required to be performed on the data block; registering the plurality of entries and the metadata under a key; generating a command capsule that includes the key under which the plurality of entries and the metadata are registered; and transmitting the command capsule to the remote system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Conventionally, in the context of InfiniBand, a memory key implements a mechanism used for secure memory access and protection within the InfiniBand fabric. The memory key is a security feature that provides an additional layer of protection for memory regions accessed by remote processes or devices in an InfiniBand network. It is used in conjunction with the InfiniBand Remote Direct Memory Access (RDMA) protocol. When a process or device wants to access a memory region of another process or device in the InfiniBand fabric, it needs to provide a valid memory key associated with that memory region. The memory key acts as a cryptographic token that ensures only authorized entities can access the memory. The memory key mechanism helps to prevent unauthorized access to memory, protecting against potential security threats such as unauthorized data access or tampering. It ensures that only processes or devices with the correct memory key can read from or write to the specified memory region. By utilizing a memory key, InfiniBand enhances the security of memory access within the network, particularly in multi-tenant or shared environments where multiple processes or devices coexist and need to access each other's memory regions securely.

According to the present disclosure, an indirect memory key (IMKEY) is used in applications utilizing scatter-gather lists (SGLs) to specify data blocks that are associated with a particular operation, such as an offloading operation, a data read operation, a data delete operation, etc. The manner in which the indirect memory key is discussed further below. Importantly, as discussed further below, the IMKEY is used in conjunction with metadata to seamlessly integrate T10-DIF (or any other type of integrity checking) into the operations that are performed using the SGLs. As used herein, the term IMKEY refers to any number, string, or alphanumerical string that points to a memory key. When an IMKEY is used to reference memory, another level lookup may need to be performed to retrieve the memory key for the memory. One example of an indirect memory key is described in section 6.1.1 of Mellanox Adapters Programmer's Reference Manual (PRM) Supporting ConnectX-4 and ConnectX-4 Lx Rev 0.40, which document is herein incorporated by reference in its entirety.

An SGL is a data structure used in computer systems and I/O (Input/Output) operations to efficiently transfer data between non-contiguous memory locations. It is particularly useful when performing bulk data transfers or when data is scattered across multiple buffers or regions. In a scatter-gather list, each entry in the list describes a specific memory buffer or region along with its associated length. Instead of requiring a single, contiguous block of memory for data transfer, the scatter-gather list allows a storage processor (and/or an offload engine) to process data from or to multiple non-contiguous locations.

In the context of InfiniBand, T10-DIF refers to a data integrity feature called T10 Data Integrity Field (DIF). T10 is a technical committee responsible for developing and maintaining standards related to SCSI (Small Computer System Interface) storage devices. T10-DIF is a method used to ensure data integrity by incorporating a checksum or a protection field in the data payload. The T10-DIF field for a particular data block may include one or more of the following: (i) a Cyclic Redundancy Check (CRC) value, (ii) an application tag, and (iii) a reference tag. The CRC value may be calculated based on the data block and subsequently used to perform a checksum on the data block. The application tag may be a 16-bit value that can be used for application-specific purposes. The application tag is often employed to provide additional integrity checking that is specific to the application using T10-DIF. The reference tag may be a 32-bit value that can be used to perform further integrity checking operations on the data block.

T10-DIX (Data Integrity Extension) is an approach for protecting data integrity that is similar to T10-DIF. The primary difference between T10-DIF and T10-DIX is the location of the protection information (PI). In T10-DIF, the PI is contiguous with the data blocks it protects, which results in an extended logical block being created. By contrast, in T10-DIF, the PI for the data block is stored in a separate buffer (which may be non-contiguous with the data block). As is discussed further below, the use of IMKEY in conjunction with an SGL allows for the identification of the PI that is associated with at least one of the data blocks that are identified by the SGL, irrespective if the PI is contiguous with the data blocks.

The T10-DIF field for a particular data block may be used to perform one or more of the following integrity check operations on the data block: CRC verification, Check-and-Replace, Data Correction, and/or any other suitable type of operation. However, it will be understood that the present disclosure is not limited to using any specific type of operation being performed on a data block based on the T10-DIF field for the data block. Although the examples presented throughout the disclosure use T10-DIF to perform integrity verification, it will be understood that the methods and techniques presented throughout the disclosure are not limited to T10-DIF, T10-DIX, and/or any other data integrity approach.

Under the nomenclature of the present disclosure, the CRC value, the reference tag, and the application tag are different examples of protection information (PI) items. However, the present disclosure is not limited to any specific type of PI being used to protect a data block. Under the present disclosure, the T10-DIF field for a particular data block is an example of a field for the data block. Under the nomenclature of the present disclosure, the term "integrity field" refers to a set of one or more PI items. In this regard, the integrity field for a given data block may be a single PI item or a plurality of PI items. Under the nomenclature of the present example, any operation that is performed based on the integrity field of a data block is referred to as an integrity operation. An integrity operation may be an operation that verifies the integrity of the data block or an operation that otherwise maintains the integrity of the data block or ensures that the integrity of the data block would remain stable. As noted above, CRC verification and check-and-replace form one example of integrity operations.

Figure 1:
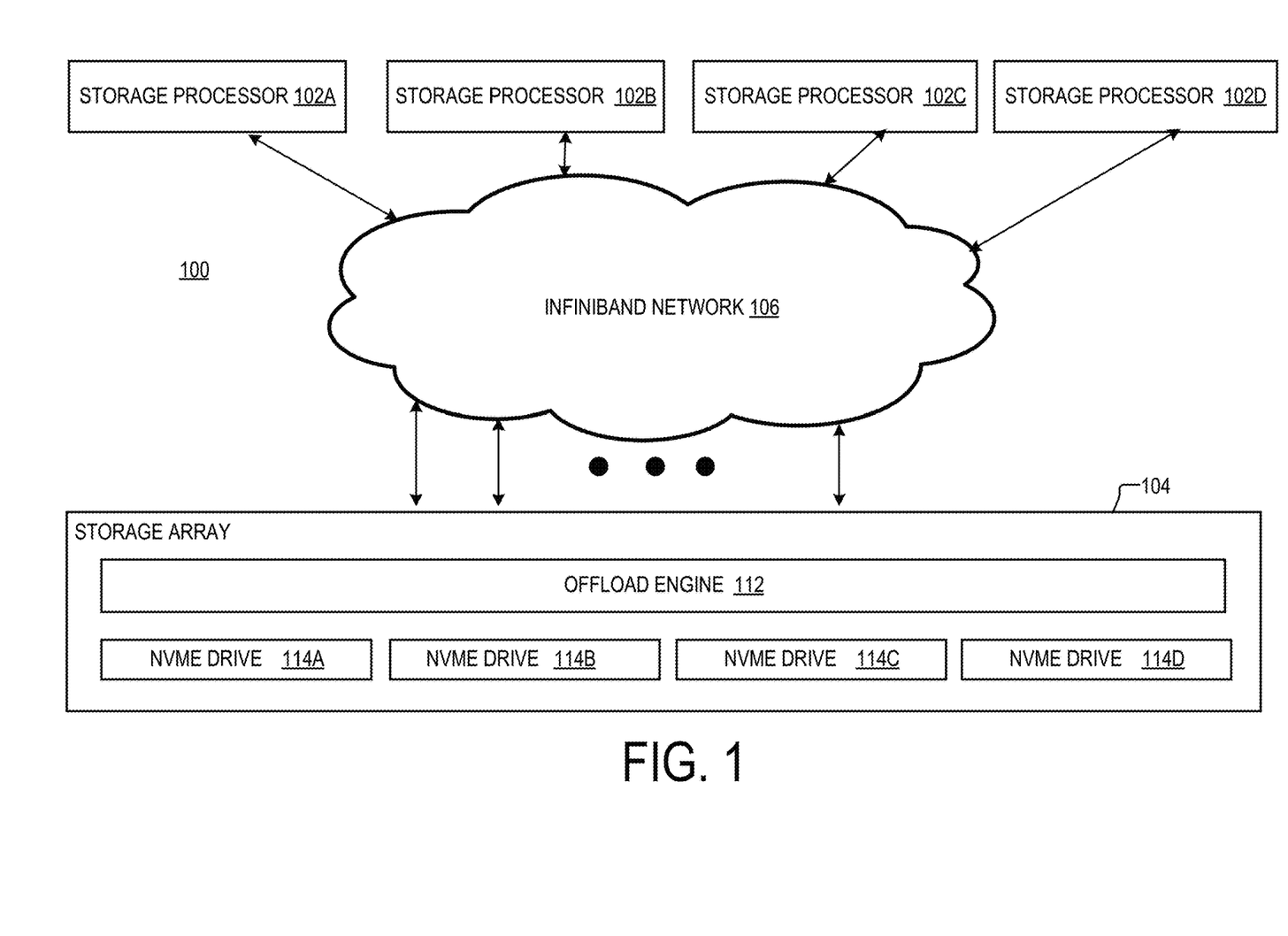
FIG. 1 is a diagram of an example of a system, according to aspects of the disclosure.

FIG. 1 is a diagram of an example of a system 100, according to aspects of the disclosure. As illustrated, the system 100 may include a plurality of storage processors 192A-D, an InfiniBand network 106, and a storage array 104. The storage array 104 may include an offload engine 112 and a plurality of Non-Volatile Memory Express (NVME) drives 114A-D (hereinafter "storage devices 114A-D"). In operation, each of the storage processors D may receive write requests, cache the data is requested to be written, and subsequently offload the cached data to the offload engine 112. The offload engine 112 may be configured to store the cached data permanently in the storage devices 114A-D. Although, in the example of FIG. 1, network 106 is an InfiniBand network, it will be understood that alternative implementations are possible in which network 106 includes any suitable type of network, such as a local area network (LAN), a wide area network (WAN), the Internet, a mobile data network (e.g., a 5G network), etc. Although in the example of FIG. 1 each of the storage devices 114A-D is an NVME drive, alternative implementations are possible in which one or more of the storage devices 114A-D is a hard disk, a Solid-State drive, and/or any other suitable type of storage device.

Figure 2A:
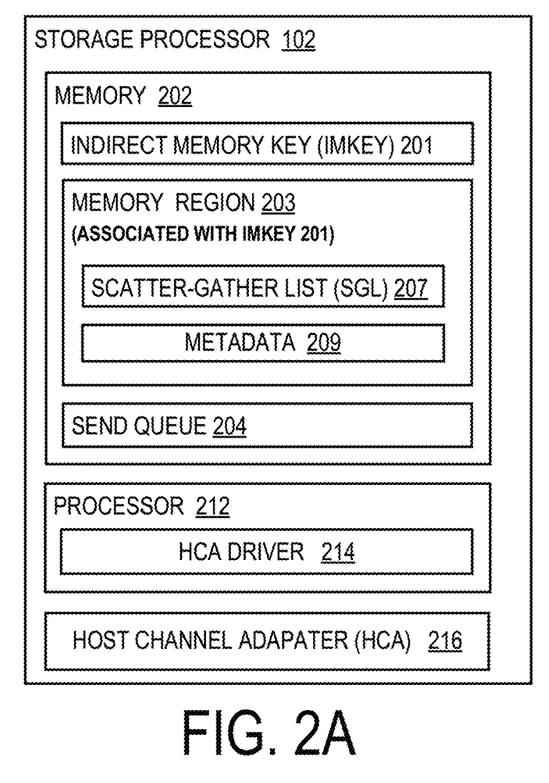
FIG. 2A is a diagram of an example of a storage processor, according to aspects of the disclosure.

FIG. 2A is a diagram of an example of a storage processor 102, according to aspects of the disclosure. As illustrated, the storage processor 102 may include a memory 202, a processor 212, and a host channel adapter (HCA) 216. According to the present example, HCA 216 is an NVIDIA ConnectX-6 TM HCA. Processor 212 may include any suitable type of processing circuitry, such as one or more of a general-purpose processor (e.g., an x86 processor, a MIPS processor, an ARM processor, etc.), a special-purpose processor, an application-specific integrated circuit (ASIC), a field programmable gate array (FPGA), etc. Memory 202 may include any suitable type of volatile and/or non-volatile memory, such as a solid-state drive (SSD), a hard disk (HD), a random-access memory (RAM), a Synchronous Dynamic Random-Access Memory (SDRAM), etc. The HCA 216 may be a circuit board or integrated circuit adapter that connects the storage processor 102 to the InfiniBand network 106 and the storage array 104 (shown in FIG. 1).

Memory 202 may be configured to store an indirect memory key (IMKEY) 201. The IMKEY 201 may include any suitable number, string, or alphanumerical string. Memory 202 may include a memory region 203, which is registered under, or otherwise associated with the IMKEY 201. Memory region 203 may include a single memory page or a plurality of memory pages. The present disclosure is not limited to memory region 203 having any specific size.

Memory 202 may be further configured to store a send queue 204. The send queue 204 may be an outbound queue that is configured to store descriptors (e.g., command capsules) that are being sent from the storage processor 102 to the offload engine 112. According to the present example, the send queue, is an InfiniBand send queue, however, the present disclosure is not limited thereto. The processor 212 may execute a driver 214 for the HCA 216. The driver may be configured to, at least in part, manage the send queue 204 as well as any other queues that are used by the storage processor 102 for the transmission of data via the HCA.

Figure 2B:
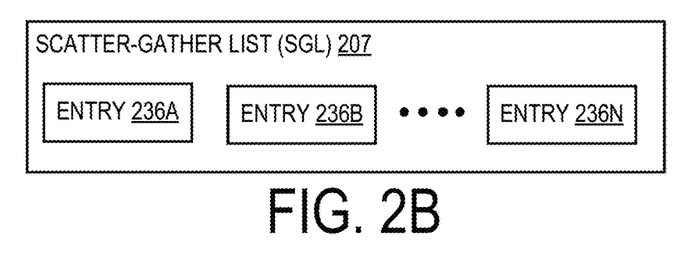
FIG. 2B is a diagram of an example of a scatter-gather list, according to aspects of the disclosure.

The memory region 203 may store an SGL 207 and metadata 209. FIG. 2B, shows the SGL 207 in further detail. As illustrated, the SGL may include a plurality of entries 236A-N. Each of the entries 236A-N may correspond to (or describe) a different contiguous region of memory 202 (or another memory). In some implementations, the entries 266336A-N may be chained, such that each of the entries 236A-N. (save for the last) may point to the next one of the entries 236A-N in the SGL 207.

The respective contiguous memory region that is described by (or corresponds to) each of the entries 236A-N may include one or more data blocks. Each of the respective data blocks, in any contiguous memory region (that is described by or corresponds to any of entries 236A-N) may be associated with a different respective integrity field. According to the present example, the integrity field is a T10-DIF or T10-DIX field. However, the present disclosure is not limited to any specific type of integrity field.

Metadata 209 may include a plurality of metadata portions. Each metadata portion may correspond to a different one of the data blocks that are part of the contiguous memory regions (described by entries 236A-N). Each metadata portion may include at least one of: (i) at least a partial indication of the memory location where the metadata portion's respective integrity field is stored, and (ii) an indication of one or more integrity operations that are required to be performed based on at least of the contents of the integrity field. In instances in which an integrity field and its corresponding data block are non-contiguous, the metadata 209 may include an indication of the location where the integrity field is stored. In instances in which an integrity field and its corresponding data block form one contiguous data chunk, the metadata 209 may indicate the bits in the chunk that are part of the integrity field. For instance, the metadata 209 may indicate that bits 0-50 in a chunk belong to user data and bits 51-64 in the chunk correspond to protection information that is useable for checking the integrity of the user data.

Figure 3:
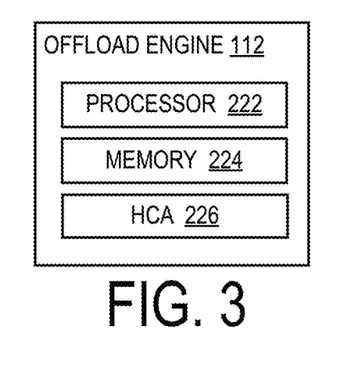
FIG. 3 is a diagram of an example of an offload engine, according to aspects of the disclosure.

As used throughout the disclosure, the phrase "an SGL is stored in a memory region" shall mean that either the SGL itself is stored in the memory region or a link or pointer to the SGL is stored in the memory region. As used throughout the disclosure, the phrase "metadata is stored in a memory region" shall mean that either the metadata itself is stored in the memory region or a link or pointer to the SGL is stored in the memory region. Stated succinctly, in the example of FIG. 2, the memory region 203 either stores the SGL 207 or a link (or another pointer) that points (directly or indirectly) to the SGL 207. Similarly, in the example of FIG. 2, the memory region 203 either stores the metadata 209 or a link (or another pointer) that points (directly or indirectly) to the metadata 209. The present disclosure is not limited to any specific format for the metadata FIG. 3 is a diagram of an example of the offload engine 112, according to aspects of the disclosure. As illustrated, the offload engine 112 may include a processor 222, a memory 224, and an HCA 226. According to the present example, HCA 226 is an NVIDIA ConnectX-6 TM HCA. HCA 226 may be coupled to HCA 216 via a direct connection (i.e., port-to-port). If there needs to be a switch between HCA 216 and HCA 226, NVIDIA Bluefield™ system-on-a-chip may be used instead.

The processor 222 may include any suitable type of processing circuitry, such as one or more of a general-purpose processor (e.g., an x86 processor, a MIPS processor, an ARM processor, etc.), a special-purpose processor, an application-specific integrated circuit (ASIC), a field programmable gate array (FPGA), etc. The memory 224 may include any suitable type of volatile and/or non-volatile memory, such as a solid-state drive (SSD), a hard disk (HD), a random-access memory (RAM), a Synchronous Dynamic Random-Access Memory (SDRAM), etc. The HCA 226 may be a circuit board or integrated circuit adapter that connects the offload engine 112 to the storage processors 102A-D) and/or the InfiniBand network 106. Although in the example of FIG. 3, the offload engine 112 is depicted as an integrated system, alternative implementations are possible in which the offload engine is a distributed computing system. In such implementations, the offload engine 112 may include a plurality of computing systems, such as the computing system shown in FIG. 3, which are coupled to one another via a communications network.

Figure 4:
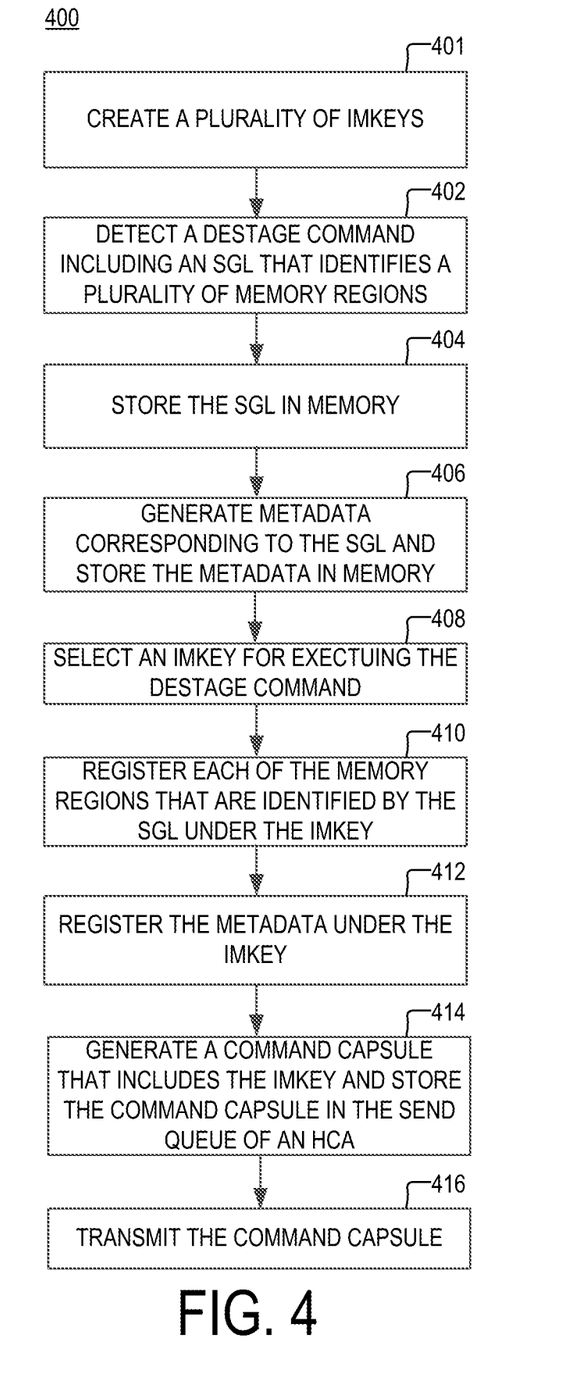
FIG. 4 is a flowchart of an example of a process, according to aspects of the disclosure.

FIG. 4 is a flowchart of an example of a process 400, according to aspects of the disclosure. According to the present disclosure, the process 400 is performed by the storage processor 102 (shown in FIG. 2A) and/or the HCA 216. However, the present disclosure is not limited to any specific entity performing the process 400.

At step 401, the processor 212 creates a plurality (or a pool) of IMKEYs. According to the present example, the plurality (or pool) includes IMKEY 201.

At step 402, the processor 212 detects a destage (or copy) command, including the SGL 207. The destage command may be received as user input or it may be generated by software that is executed on the processor 212 or software that is executed on a remote system. In instances in which the destage command is generated by software executing on a remote system, the destage command may be received over a communications network that connects the processor 212 with the remote system. The destage command may include any command instructing the processor 212 to copy the data that is stored in the memory regions described by the entries 236 in the SGL 207 to the storage array 104.

At step 404, the SGL 207 is stored in memory 202.

At step 406, the processor 212 generates metadata that corresponds to the SGL 207. Specifically, according to the present example, the processor 212 generates the metadata 209. As noted above, the SGL may identify one or more memory regions. Each memory region may include one or more data blocks. For each data block that is identified in the memory region, the metadata may identify one or both of: (i)

the location in memory (e.g., memory 202) where the integrity field for the data block is stored, and (ii) one or more integrity operations that need to be performed based on at least some of the contents of the integrity field of the data block. For example, if the integrity field for a data block is T10-DIF field, the metadata for the data block (which is part of metadata 209) may indicate which one of the CRC, reference tag, or application tag should be used to perform the integrity operation. In the present example, the CRC, application tag, and reference are all part of the T10-DIF field for the data block. Additionally or alternatively, the metadata for the data block may identify the type of integrity operation that needs to be performed for the data block based on the integrity field for the data block. As noted above, the metadata may include a plurality of entries. Each entry may include a direct memory key (or address or address or another identifier) of a different one of the data blocks that are represented by the SGL. In addition, each entry may identify one of the location where the integrity field for the data block is stored (or portion thereof) and/or the type of integrity operation that needs to be performed for the data block. Additionally or alternatively, the association between entries in the metadata and respective data blocks may be implied in the order of the entries—e.g., the first entry may be associated with the first data blocks (e.g., data block having the lowest address number) in the SGL 207, the second entry may be associated with the second data block that is identified by the SGL. The present disclosure is not limited to any specific way for mapping metadata entries to their associated data blocks.

At step 408, the processor selects an IMKEY from the pool of IMKEYs that is created at step 401). According to the present example, IMKEY 201 is selected. In some implementations, the IMKEY may be removed from the pool upon being selected, and returned back to the pool after the indication transmitted at step 509 of process 500 is received. Although in the example of FIG. 4 an indirect memory key is selected, it will be understood that alternative implementations are possible in which another type of key is selected. As used herein, the term "key" refers to any number, string, or alphanumerical string.

At step 410, the processor 212 registers each of the memory regions identified in the SGL under the IMKEY. By way of example, the processor 212 may identify a different respective direct key (or address) for each of the data blocks that are represented by the SGL and associate the direct memory key with the IMKEY that is selected at step 408. As another example, when a different type of key is used (instead of the IMKEY 201), the SGL may associate with the key a plurality of data structures, wherein each of the data structures identifies the starting block and length of a different one of the memory regions. Stated succinctly, the present disclosure is not limited to any specific method for associating the memory regions (or blocks thereof) with an IMKEY or another type of key.

In some implementations, the registration may be performed by using a table (or another data structure). The table may be stored in memory 202. Registering each of the data blocks may include adding to the table a different respective entry (e.g., a row) that includes the direct memory key (or another identifier) of the data block. Additionally or alternatively, in some implementations, each entry in the table may be associated with an entire memory region that corresponds to a different one of the entries 236A-N in SGL 207. In such implementations, each entry may include an indication of the starting block of the entry's memory region and an indication of the total number of blocks in the memory region.

At step 412, the processor 212 registers the metadata under the IMKEY that is selected at step 408. In some implementations, the registration may be performed by using a table (or another data structure). The table may be stored in memory 202. Registering the metadata may include adding an entry (e.g., a row) to the table that includes a direct memory key for the starting address of the metadata 209 and/or any other information that is necessary for the retrieval of the metadata 209. In some implementations, the entry may include an indication that it is associated with metadata. Additionally or alternatively, the table or data structure may include an indication that identifies the entry as being associated with metadata. Although in the present example, a memory key for the table is mapped to the IMKEY, in instances in which another type of key is selected at step 408 instead of an IMKEY, the key (selected at step 408) may be mapped directly to the table (or to the metadata), rather than to a direct memory key for the metadata.

At step 414, the processor 212 generates a command capsule and stores the command capsule in the send queue 204. In some implementations, the processor 212 may also post a work request in the receive queue (not shown) of HCA 216 (which is stored in memory 202) that notifies the HCA 216 to be ready to receive data/messages that are associated with the command capsule.

According to the present example, the command capsule includes the IMKEY (or another type of key) selected at step 408. In addition, the command capsule includes an offset (e.g., LBA) where the data associated with the SGL is required to be stored as well as an indication, as well as the total length of the data that is associated with the SGL. Although the regions identified by the SGL may be non-contiguous, the data located in these regions would be packed at one contiguous memory region in the storage array 104, which is identified by offset and length which are included in the command capsule.

At step 416, the HCA 216 retrieves the command capsule from the send queue 204 and transmits the command capsule to the offload engine 112.

Figure 5:
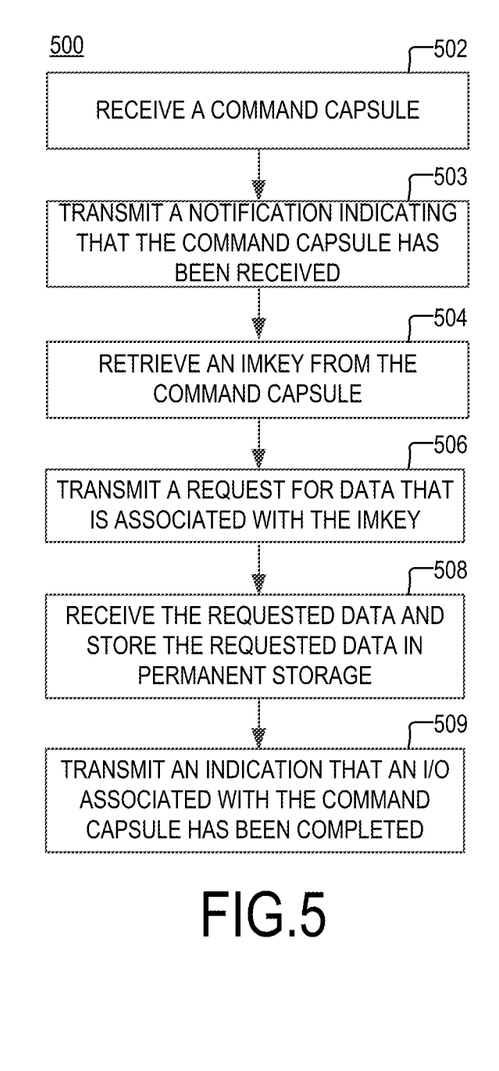
FIG. 5 is a flowchart of an example of a process, according to aspects of the disclosure.

FIG. 5 is a flowchart of an example of a process 500, according to aspects of the disclosure. According to the present example, the process 500 is performed by the offload engine 112. For example, the process 500 may be performed wholly or in party by the HCA 226 of the offload engine 112. However, it will be understood that the present disclosure is not limited to any specific entity performing the process 500.

At step 502, the offload engine 112 receives the command capsule that is transmitted at step 414 of the process 400.

At step 503, the offload engine transmits to the HCA 216 of one of storage processors 102A-D) an acknowledgement that the command capsule has been received.

At step 504, the offload engine 112 retrieves, from the command capsule, the IMKEY 201. Although, in the present example, an indirect memory key is retrieved, alternative implementations are possible in which another type of key is retrieved and subsequently used by the process 500.

At step 506, the offload engine 112 transmits a request for data that is associated with the IMKEY 201. According to the present example, the request is an RDMA read request (or another type of RDMA request). However, the present disclosure is not limited thereto. In some implementations, the RDMA may include the IMKEY as an identifier of the location (e.g., direct memory key, address, etc.) from where data is desired to be read. In other words, the RDMA request may have the same (or similar) format to that of a conventional RDMA request, but for including an IMKEY rather than a direct memory key.

The offload engine 112 may or may not be aware of the distinction between the IMKEY or a direct memory, or that it is including an IMKEY rather than a direct memory key in the RDMA read request (or another type of RDMA request). Upon receiving the RDMA read request (or another type of RDMA request), the HCA 216 would be able to test that the RDMA read request includes an IMKEY instead of a direct memory key (or another type of address). In other words, the HCA 216 may first detect whether the RDMA read request includes: (i) an IMKEY as an identifier of the location from which data is requested to be read or (ii) a direct memory key (or another address) of the location from which data is requested to be read, and the HCA would fulfill the RDMA read request by executing at least a portion of the process 600 (shown in FIGS. 6A-B) in response to detecting that the RDMA read request includes an IMKEY. If the RDMA read request does not include an IMKEY, the offload engine 112 may fulfil the RDMA read request by executing another process (that is different from process 600).

At step 508, the offload engine receives the requested data and stores the requested data in the storage devices 114A-D.

At step 509, the offload engine transmits to the HCA 216 of the one of the storage processors 102A-D an indication that the I/O associated with the command capsule (received at step 508) has been completed.

Figure 6A:
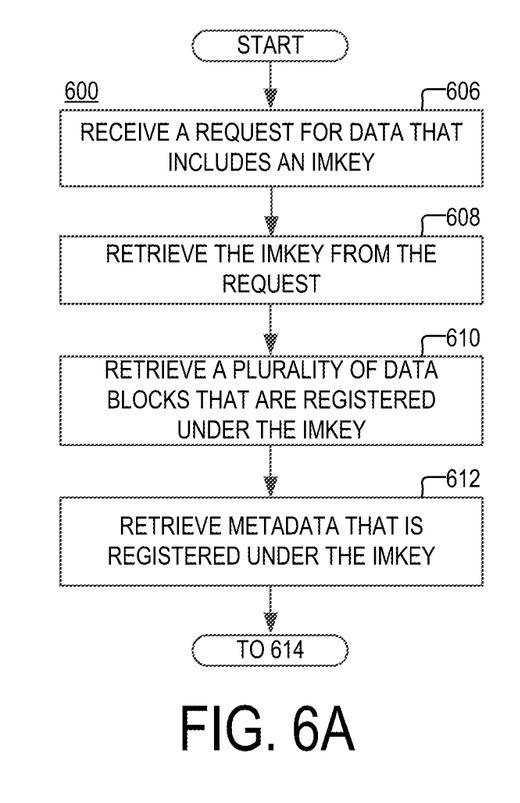
FIG. 6A is a flowchart of an example of a process, according to aspects of the disclosure.
Figure 6B:
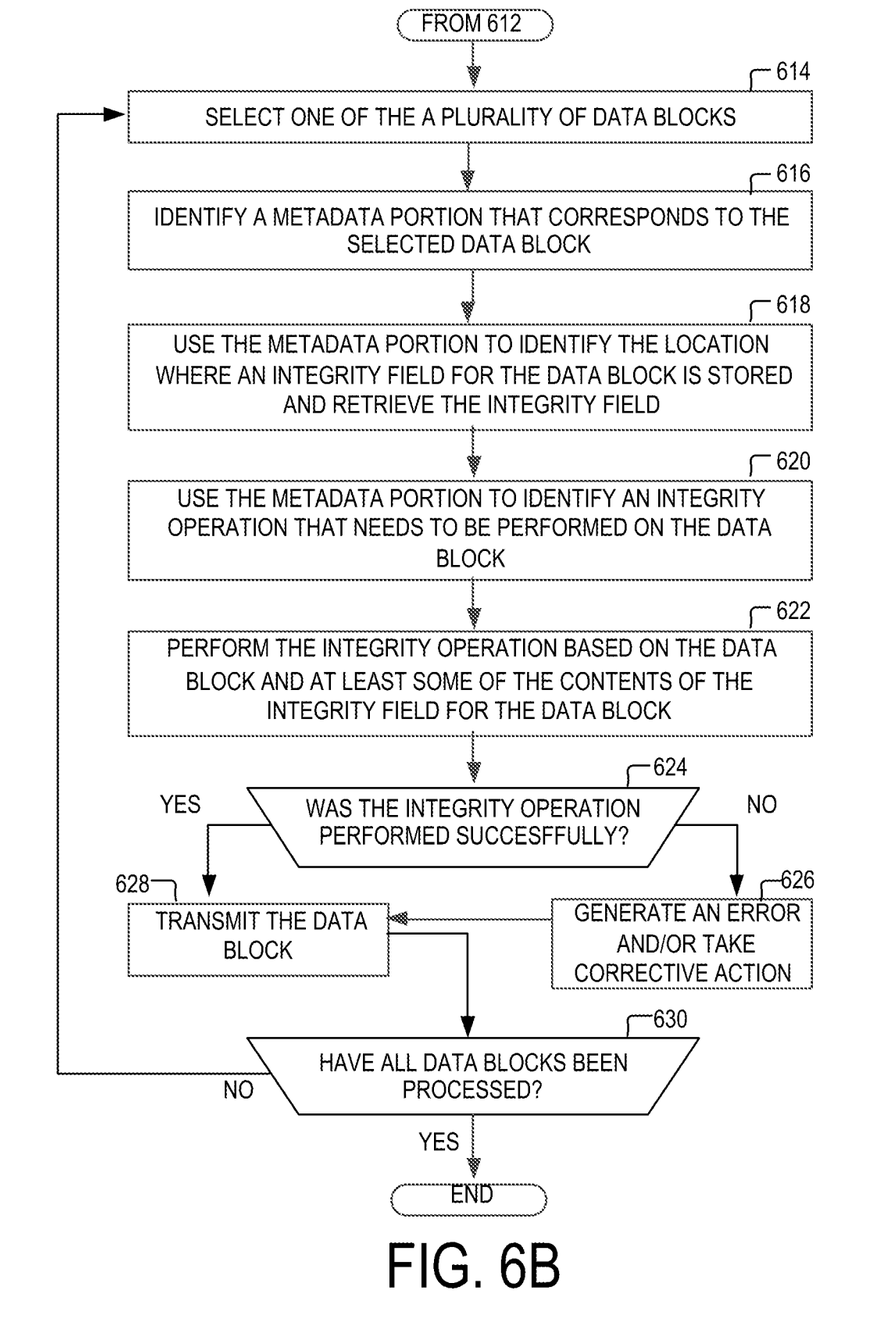
FIG. 6B is a flowchart of an example of a process, according to aspects of the disclosure.

FIGS. 6A-B are flowcharts of an example of a process 600, according to aspects of the disclosure. According to the present example, the process 600 is performed by the HCA 216. However, the present disclosure is not limited to any specific entity performing the process 600. For example, in some implementations, any or all of the steps in process 600 may be performed by the processor 212.

At step 606, HCA 216 receives the request that is transmitted at step 506 of process 500.

At step 608, the HCA 216 retrieves the IMKEY 201 from the request. Although, in the present example, an indirect memory key is retrieved, alternative implementations are possible in which another type of key is retrieved and subsequently used by the process 600

At step 610, the HCA 216 identifies one or more memory data blocks that are registered under the IMKEY.

At step 612, the HCA 216 retrieves metadata that is registered under the IMKEY. According to the present example, the metadata 209 is retrieved.

At step 614, the HCA 216 selects one of the data blocks (retrieved at step 612), which has not been selected during an earlier iteration of steps 614-630.

At step 616, the HCA 216 identifies a portion of the metadata (retrieved at step 610), which corresponds to the data block (selected at step 614). According to the present example, the metadata portion may include both of: (i) an indication of a location where an integrity field for the data block (selected at step 614) is stored, and (ii) an indication of an integrity operation that needs to be performed At step 618, the HCA 216 uses the metadata portion (identified at step 616) to identify the location where the integrity field for the data block (selected at step 614) is stored and retrieves the integrity field from the identified location. In some implementations, using the metadata includes (i) retrieving from the metadata an indication of a memory location where the integrity field is stored, and (ii) retrieving the integrity field from the memory location.

At step 620, the HCA 216 uses the metadata portion (identified at step 616) to identify an integrity operation that needs to be performed on the data block. In some implementations, identifying the integrity operation may include retrieving an identifier of the operation from the metadata portion (identified at step 616). As a non-limiting example, the metadata portion may identify one of CRC verification, Check-and-Replace, Data Correction as the integrity operation that needs to be performed on the data block.

At step 622, the HCA 216 performs the integrity operation (identified at step 620) based on the data block (selected at step 614) and at least some of the contents of the integrity field (identified at step 618). For example, when the integrity operation is a CRC check, the HCA 216 may retrieve the CRC code for the data block from the integrity field and determine if the current contents of the data block. If the CRC matches the data block, the integrity operation is said to have been completed successfully. If the CRC code does not match the current contents of the data block, the CRC check is said to have not been completed successfully.

At step 624, the HCA 216 determines if the integrity operation (performed at 622) is completed successfully. If the integrity operation is completed successfully, the process 600 proceeds to step 628. Otherwise, if the integrity operation is not completed successfully, the process 600 proceeds at step 626.

At step 626, the HCA 216 generates an error or takes a corrective action, after which the process 600 proceeds to step 626. In some implementations, generating an error may include storing in a predetermined memory location an indication that the integrity operation could not be performed successfully. Additionally or alternatively, generating the error may include transmitting the indication to the offload engine. Taking a corrective action may include modifying the data block (before it is transmitted) based on at least some of the contents of the integrity field to correct the error.

At step 628, the HCA 216 transmits the data block to the offload engine 112.

At step 630, the HCA 216 determines if all data blocks (retrieved at step 612) have been processed. If all data blocks have been processed, the process 600 ends. Otherwise, if there are data blocks that remain to be processed, the process 600 returns to step 614, and another data block is selected as a result.

FIGS. 1-6B are provided as an example of a process in which: (i) a first instruction is received a storage processor (or another initiator) which includes an SGL identifying a plurality of memory address, (ii) the SGL along with metadata is stored in a memory region associated with an IMKEY, (iii) the IMKEY is forwarded to an offload engine (or another remote system), (iv) the offload engine returns the IMKEY back to the storage processor along with a second command, (v) the storage processor uses the IMKEY to identify data blocks identified by the SGL and the location of integrity fields for the data blocks, (vi) the storage processor uses the integrity fields to perform integrity operations on the data blocks, and (vii) the storage processor executes the second command after the integrity operations are complete. Although in the example of FIGS. 4-6B, the first command (detected at step 404) is a data offload command, the present disclosure is not limited to any specific command being detected. By way of example, the first command may be any suitable type of I/O command, such as a read or write command.

At least some of the steps discussed with respect to FIGS. 4-6B may be performed in parallel, in a different order, or altogether omitted. For example, in some implementations, the integrity checks may be performed at step 626 concurrently with the transmission of data at step 628. The integrity checks performed at step 626 are different from any integrity checks that are performed on the receiver side—e.g., by storage devices in the storage array 104. Although the examples provided throughout the disclosure use an IMKEY, it will be understood that any other key (direct or indirect) may be used instead. In this regard, it will be understood that the processes discussed above are in no way limited to using an IMKEY to register the entries in an SGL and metadata, and subsequently to service a request for the data that is provided by an offload engine or another device.

In some embodiments, the term "I/O request" or simply "I/O" may be used to refer to an input or output request. In some embodiments, an I/O request may refer to a data read or write request. At least some of the steps discussed with respect to FIGS. 1-6B may be performed in parallel, in a different order, or altogether omitted. As used throughout the disclosure, the term processing circuitry of a computing device may refer to one or more of (i) one or more general or special purpose processors of the computing device, (ii) a controller of an HCA of the computing device.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing device, the method comprising:
   detecting, by the computing device, a first command to copy data to a remote system, the first command including a scatter-gather list (SGL) that identifies the data that is desired to be copied, the SGL including a plurality of entries that identify a plurality of memory regions, each of the plurality of entries identifying a different one of the plurality of memory regions, each of the plurality of memory regions including one or more data blocks;
   generating, by the computing device, metadata for the SGL, wherein, for each of the data blocks in the plurality of memory regions, the metadata identifies at least one of: (i) a location where a respective integrity field for the data block is stored, and (ii) a respective integrity operation that is required to be performed on the data block;
   registering, by the computing device, the plurality of entries and the metadata under an indirect memory key (IMKEY);
   generating, by the computing device, a command capsule that includes the key IMKEY under which the plurality of entries and the metadata are registered; and
   transmitting, by the computing device, the command capsule to the remote system.

2. The method of claim 1, further comprising:
   receiving, by the computing device, a second command that includes the key IMKEY, the second command being received from the remote system in response to the first command;
   executing the second command by: retrieving the IMKEY from the second command, using the IMKEY to obtain the data blocks that are part of each of the plurality of memory regions, using the IMKEY to obtain the metadata, using the metadata to perform the respective integrity operation for each of the data blocks, and transmitting each of the data blocks to the remote system.

3. The method of claim 2, wherein using the metadata to perform the respective integrity operation for each of the data blocks includes:
   identifying, based on the metadata, the location where the respective integrity field for the data block is stored and retrieving contents of the respective integrity field;
   identifying, based on the metadata, an integrity operation that is required to be performed on the data block; and
   performing the identified integrity operation based on the retrieved contents of the respective integrity field.

4. The method of claim 2, wherein the second command includes a Remote Direct Memory Access (RDMA) read request.

5. The method of claim 1, wherein the first command includes a data offload command.

6. The method of claim 1, wherein for each of the data blocks in any of the plurality of memory regions, the metadata identifies both of: (i) the location where the respective integrity field for the data block is stored, and (ii) the respective integrity operation that is required to be performed on the data block.

7. A system, comprising:
   a memory; and
   a processing circuitry configured to perform the operations of:
   detecting a first command to copy data to a remote system, the first command including a scatter-gather list (SGL) that identifies the data that is desired to be copied, the SGL including a plurality of entries that identify a plurality of memory regions, each of the plurality of entries identifying a different one of the plurality of memory regions, each of the plurality of memory regions including one or more data blocks;
   generating metadata for the SGL, for each of the data blocks in the plurality of memory regions, wherein the metadata identifies at least one of: (i) a location where a respective integrity field for the data block is stored, and (ii) a respective integrity operation that is required to be performed on the data block;
   registering the plurality of entries and the metadata under an indirect memory key (IMKEY);
   generating a command capsule that includes the IMKEY under which the plurality of entries and the metadata are registered; and
   transmitting the command capsule to the remote system.

8. The system of claim 7, wherein the processing circuitry is further configured to perform the operations of:
   receiving a second command that includes the IMKEY, the second command being received from the remote system in response to the first command;
   executing the second command by: retrieving the IMKEY from the second command, using the IMKEY to obtain the data blocks that are part of each of the plurality of memory regions, using the IMKEY to obtain the metadata, using the metadata to perform the respective integrity operation for each of the data blocks, and transmitting each of the data blocks to the remote system.

9. The system of claim 8, wherein using the metadata to perform the respective integrity operation for each of the data blocks includes:
   identifying, based on the metadata, the location where the respective integrity field for the data block is stored and retrieving contents of the respective integrity field;
   identifying, based on the metadata, an integrity operation that is required to be performed on the data block; and
   performing the identified integrity operation based on the retrieved contents of the respective integrity field.

10. The system of claim 8, wherein the second command includes a Remote Direct Memory Access (RDMA) read request.

11. The system of claim 7, wherein the first command includes a data offload command.

12. The system of claim 7, wherein for each of the data blocks in any of the plurality of memory regions, the metadata identifies both of: (i) the location where the respective integrity field for the data block is stored, and (ii) the respective integrity operation that is required to be performed on the data block.

13. A non-transitory computer-readable medium storing one or more processor-executable instructions, which when executed by a processing circuitry, further cause the processing circuitry to perform the operations of:
   detecting a first command to copy data to a remote system, the first command including a scatter-gather list (SGL) that identifies the data that is desired to be copied, the SGL including a plurality of entries that identify a plurality of memory regions, each of the plurality of entries identifying a different one of the plurality of memory regions, each of the plurality of memory regions including one or more data blocks;

generating metadata for the SGL, for each of the data blocks in the plurality of memory regions, wherein the metadata identifies at least one of: (i) a location where a respective integrity field for the data block is stored, and (ii) a respective integrity operation that is required to be performed on the data block;

registering the plurality of entries and the metadata under an indirect memory key (IMKEY);

generating a command capsule that includes the key-IMKEY under which the plurality of entries and the metadata are registered; and transmitting the command capsule to the remote system.

14. The non-transitory computer-readable medium of claim 13, wherein the one or more processor-executable instructions further cause the processing circuitry to perform the operations of:

receiving a second command that includes the IMKEY, the second command being received from the remote system in response to the first command;

executing the second command by: retrieving the IMKEY from the second command, using the IMKEY to obtain the data blocks that are part of each of the plurality of memory regions, using the IMKEY to obtain the metadata, using the metadata to perform the respective integrity operation for each of the data blocks, and transmitting each of the data blocks to the remote system.

15. The non-transitory computer-readable medium of claim 14, wherein using the metadata to perform the respective integrity operation for each of the data blocks includes:

identifying, based on the metadata, the location where the respective integrity field for the data block is stored and retrieving contents of the respective integrity field;

identifying, based on the metadata, an integrity operation that is required to be performed on the data block; and performing the identified integrity operation based on the retrieved contents of the respective integrity field.

16. The non-transitory computer-readable medium of claim 14, wherein the second command includes a Remote Direct Memory Access (RDMA) read request.

17. The non-transitory computer-readable medium of claim 13, wherein the first command includes a data offload command.

18. The non-transitory computer-readable medium of claim 13, wherein for each of the data blocks in any of the plurality of memory regions, the metadata identifies both of: (i) the location where the respective integrity field for the data block is stored, and (ii) the respective integrity operation that is required to be performed on the data block.

* * * * *